(12) United States Patent
Govindan et al.

(10) Patent No.: US 11,430,040 B2
(45) Date of Patent: Aug. 30, 2022

(54) SMART BASKET RECOMMENDATIONS FOR ONLINE SELECTIONS

(71) Applicant: Walmart Apollo, LLC, Bentonville, AR (US)

(72) Inventors: Kannan Govindan, Bangalore (IN); Deepak Arora, Hyderabad (IN); Varun Srivastava, Bangalore (IN); Diego Alvaro Goyret, Los Gatos, CA (US); Prashant Gupta, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 184 days.

(21) Appl. No.: 16/775,477

(22) Filed: Jan. 29, 2020

(65) Prior Publication Data
US 2021/0233148 A1    Jul. 29, 2021

(51) Int. Cl.
*G06Q 30/06* (2012.01)
*G06F 16/9032* (2019.01)
(Continued)

(52) U.S. Cl.
CPC ..... *G06Q 30/0631* (2013.01); *G06F 16/9035* (2019.01); *G06F 16/9038* (2019.01);
(Continued)

(58) Field of Classification Search
CPC .......... G06F 16/90328; G06F 16/9035; G06F 16/9038; G06F 16/9538; G06F 17/18;
(Continued)

(56) References Cited

U.S. PATENT DOCUMENTS

| | | | |
|---|---|---|---|
| 7,720,720 B1 * | 5/2010 | Sharma | G06Q 30/02 705/26.7 |
| 8,554,600 B2 * | 10/2013 | Reisman | G06Q 30/0631 705/7.29 |

(Continued)

FOREIGN PATENT DOCUMENTS

WO    WO-2021077226 A1 *    4/2021    ............... G06N 3/02

OTHER PUBLICATIONS

Deng, Wei; "Hybrid and Dynamic Recommender Models for Consumer Decision Making and Marketing." Order No. 10247163, University of Nebraska at Omaha, Nov. 2016. (Year: 2016).*

*Primary Examiner* — Adam L Levine
(74) *Attorney, Agent, or Firm* — Bryan Cave Leighton Paisner LLP

(57) ABSTRACT

A system including one or more processors and one or more non-transitory computer-readable media storing computing instructions configured to run on the one or more processors and perform tracking respective duration data for each respective item of items in a catalog based on purchase histories; measuring a reorder rate for the each respective item within one or more first periods of time; generating a Weibull distribution for the each respective item; training a machine learning model based on previous orders by the users; generating, using the machine learning model, as trained, a ranked list of one or more first items for a user of the users, a respective predicted quantity for each of the one or more first items, and an average basket size for the user; receiving a request for recommended items from the user using a user interface; and sending the ranked list of the one or more first items to be displayed on the user interface. Other embodiments are disclosed.

20 Claims, 9 Drawing Sheets

(51) Int. Cl.
  *G06N 20/00* (2019.01)
  *G06F 16/9038* (2019.01)
  *G06F 16/9538* (2019.01)
  *G06F 17/18* (2006.01)
  *G06F 16/9035* (2019.01)

(52) U.S. Cl.
  CPC .... *G06F 16/90328* (2019.01); *G06F 16/9538* (2019.01); *G06F 17/18* (2013.01); *G06N 20/00* (2019.01); *G06Q 30/0633* (2013.01); *G06Q 30/0643* (2013.01)

(58) Field of Classification Search
  CPC ............... G06N 20/00; G06N 3/00; G06Q 30/06–0645; G06Q 30/08; G06Q 50/01; G16Y 10/00–90
  See application file for complete search history.

(56) References Cited

U.S. PATENT DOCUMENTS

| | | | |
|---|---|---|---|
| 10,891,678 B1* | 1/2021 | Muralidharan | G06F 7/026 |
| 2015/0012381 A1 | 1/2015 | Lazaro | |
| 2016/0092519 A1* | 3/2016 | Srivastava | G06Q 30/0641 707/722 |
| 2017/0024663 A1 | 1/2017 | Liu | |
| 2017/0262926 A1 | 9/2017 | High et al. | |
| 2020/0410573 A1* | 12/2020 | Kraus | G06Q 30/0264 |
| 2021/0125073 A1* | 4/2021 | Keng | G06N 3/0445 |
| 2021/0390498 A1* | 12/2021 | Ohlsson | G06Q 10/067 |

* cited by examiner

SMART BASKET RECOMMENDATIONS FOR ONLINE SELECTIONS

TECHNICAL FIELD

This disclosure relates generally relates to smart basket recommendations for online selections.

BACKGROUND

Users can visit a website to order items online as often as several times per week. An online cart often includes more than fifty percent of items that are regularly reordered. Generally, many items have a shelf life or an expiration date within which the item can be consumed. Ordering an item online often begins with a search of the web site to locate the item before selecting it to add to a cart. Such an online ordering approach can be time-consuming for the user and can expend computer resources to reorder regularly ordered items.

BRIEF DESCRIPTION OF THE DRAWINGS

To facilitate further description of the embodiments, the following drawings are provided in which.

Figure 1:
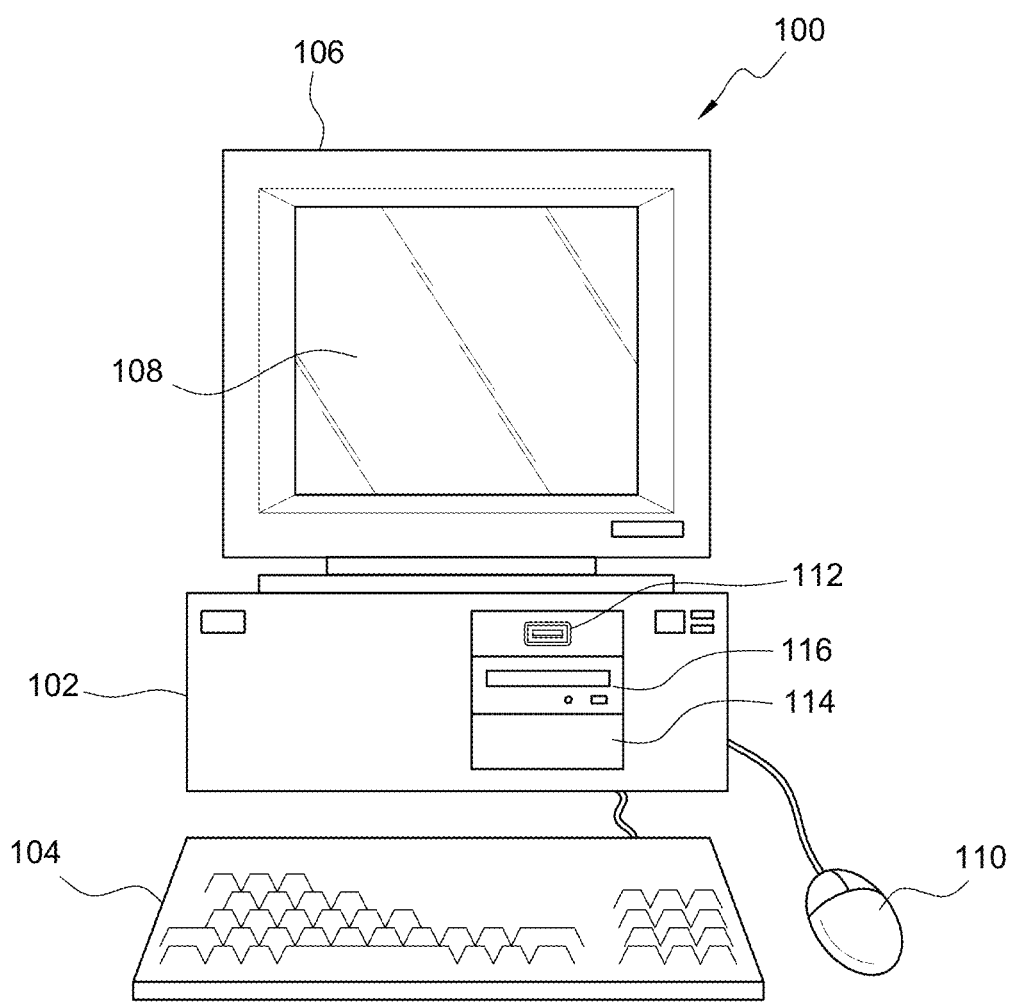
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A smart basket system can be capable of identifying an item that a user regularly reorders by tracking duration data for that item. Such duration data can include a period of time in which the item is generally consumed (e.g., used up) by users. Additionally, such duration data also can be based on a period of time such as when the item expires, such as an expiration date for the item. A smart basket system can generate a list of regularly ordered items to add to a cart for a user that can be personalized for the user and/or based on respective duration data set for each item using a smart basket system.

Figure 2:
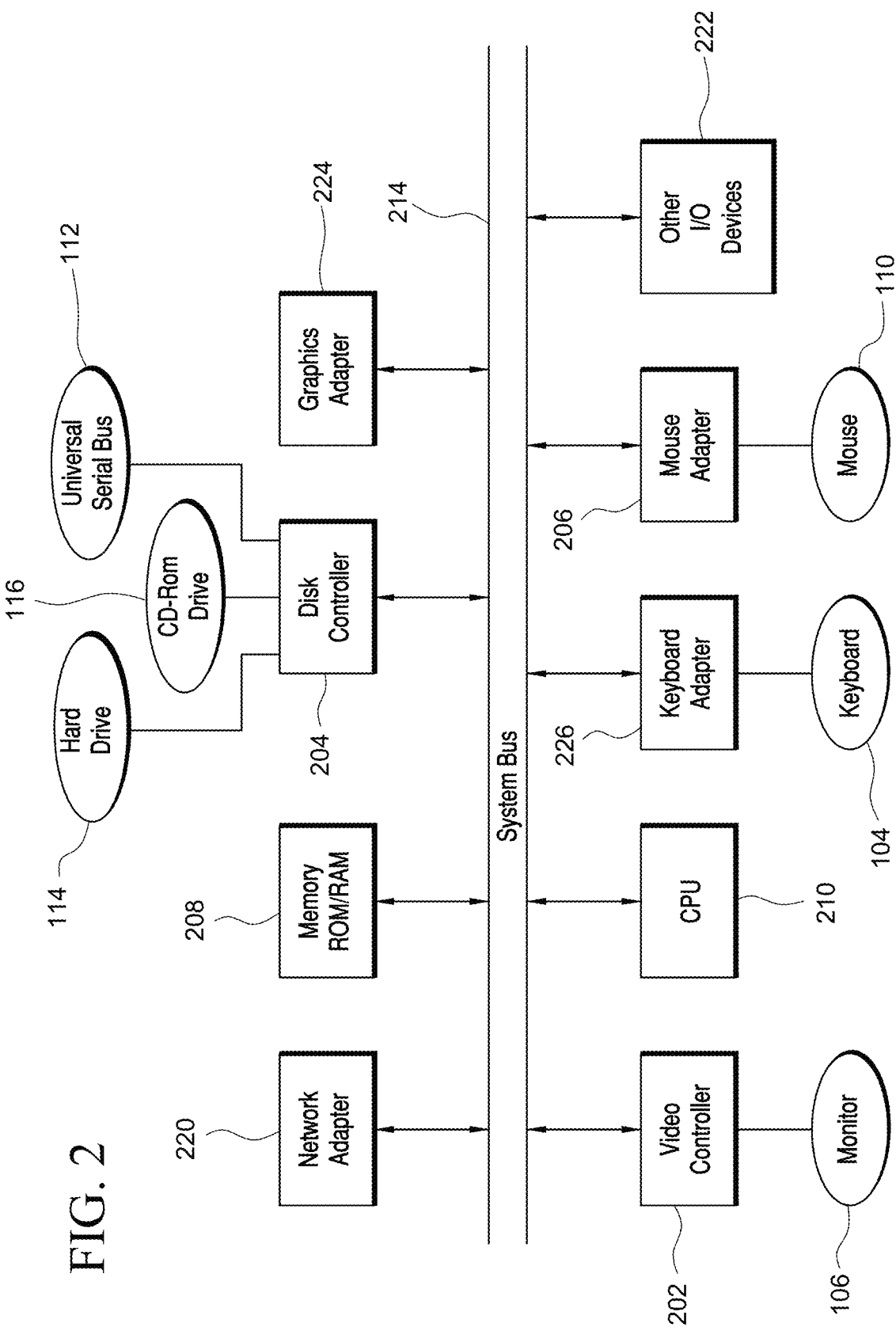
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
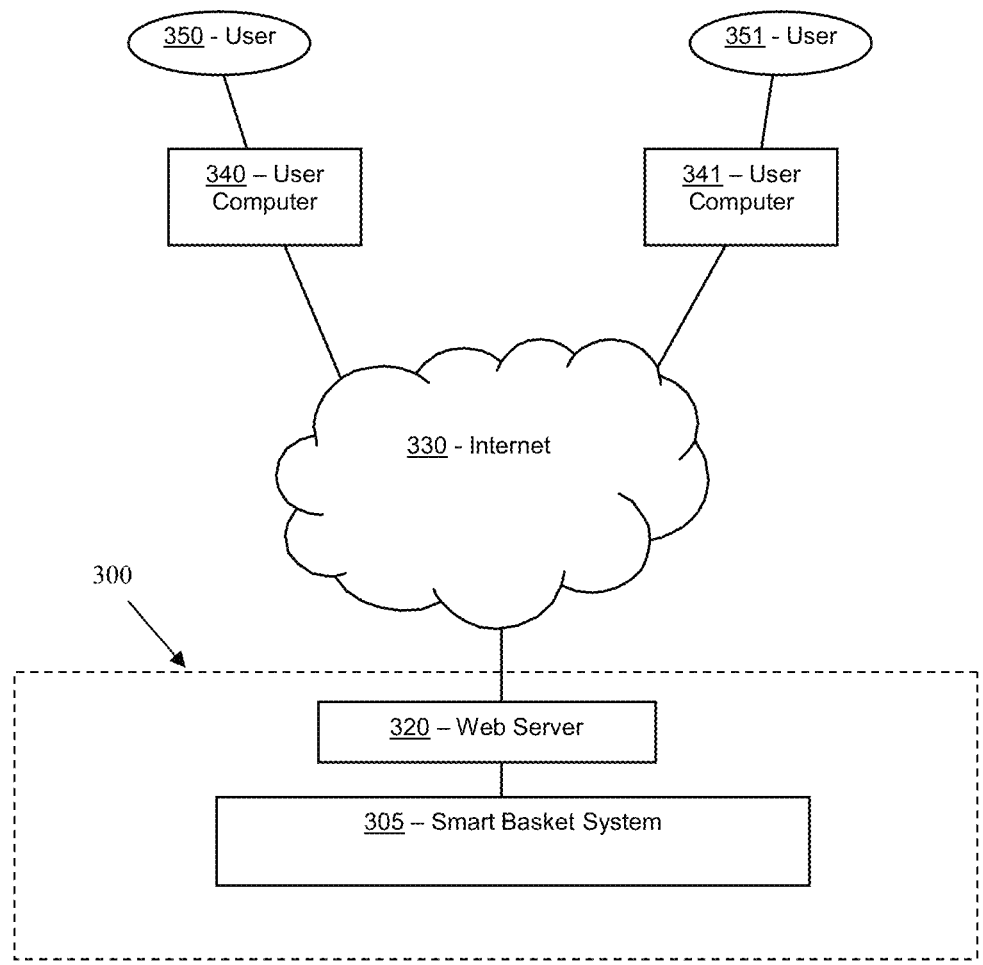
FIG. 3 illustrates a block diagram of a system that can be employed for providing smart basket recommendations for online selections, according to an embodiment.

Turning ahead in the drawings, FIG. 3 illustrates a block diagram of a system 300 that can be employed for providing smart basket recommendations for online selections, according to an embodiment. In a number of embodiments, smart basket recommendations can involve automatically displaying a list of regularly ordered items from a catalog on a user computer (e.g., 340-341 (FIG. 3)) of a user (e.g., 350-351 (FIG. 3)) on a given date. In several embodiments, such a list of regularly ordered items can be based upon a probability that the user will likely reorder the item during a particular browse session of a website. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a smart basket system 305, and/or a web server 320. Smart basket system 305 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, smart basket system 305 and/or web server 320. Additional details regarding smart basket system 305 and web server 320 are described herein.

In a number of embodiments, each of smart basket system 305 and/or web server 320 can be a special-purpose computer programed specifically to perform specific functions not associated with a general-purpose computer, as described in greater detail below.

In some embodiments, web server 320 can be in data communication through Internet 330 with one or more user computers, such as user computers 340 and/or 341. Internet 330 can be a public or private network. In some embodiments, user computers 340-341 can be used by users, such as users 350 and 351, which also can be referred to as customers, in which case user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In some embodiments, an internal network that is not open to the public can be used for communications between smart basket system 305 and/or web server 320 within system 300. Accordingly, in some embodiments, smart basket system 305 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, smart basket system 305 and/or web server 320 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to smart basket system 305 and/or web server 320, in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of smart basket system 305 and/or web server 320. In a similar manner, the processors and/or the non-transitory computer-readable media can be local and/or remote to each other.

Meanwhile, in many embodiments, smart basket system 305 and/or web server 320 also can be configured to communicate with and/or include one or more databases and/or other suitable databases. The one or more databases can include a product database that contains information about products, items, or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between smart basket system 305 and/or web server 320 and/or the one or more databases, can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as for example, universal serial bus(es), one or more networking cables, such as for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, smart basket system 305 can be a general-purpose computer or a special-purpose computer programmed to perform specific functions and/or applications. For example, smart basket system 305 can implement one or more machine-learning predictive-basket models to determine a list (e.g., a set or a group) of items regularly ordered to recommend to a user (e.g., 350-351) with a high level of confidence that the user will select one or more of the items in the list of items. In some embodiments, smart basket system 305 can perform modifying and/or updating a probability of reordering each of the items regularly ordered by the user. In several embodiments, the probability of reordering a list of items, based on one or more machine-learning predictive-basket models, can be for a specific period of time, such as during a current browse session, or during a day, 2 days, or 3 days, for example. In many embodiments, the probability of reordering a single item of a list of items can be based at least in part on the duration data for that item, which can be used to generate a Weibull distribution for that item. In various embodiments, the list of items to recommend to a user (e.g., 350-351) for a period of time can be modified and/or updated each time the user visits the page (e.g., webpage) and/or automatically updated during another suitable period of time. In some embodiments, a smart basket system can generate a list (e.g., a ranked list of one or more first items generated by a machine learning model) of regularly ordered items to add to a cart for a user that can be personalized for a user. A list of predictive recommendations can be generated by ranking each item by a predictive indication of when the item will likely be reordered by the user. The list of predictive recommendations can be presented on a given day based on (i) a respective duration data set for each item and/or (ii) one or more user features. Such a list of regularly ordered items also can be pre-filled into a cart for a user upon a selection of a typeahead search query (e.g., an indicator or icon) on a user interface (e.g., a graphical user interface) of a user computer (e.g., such as 340-341).

Figure 4:
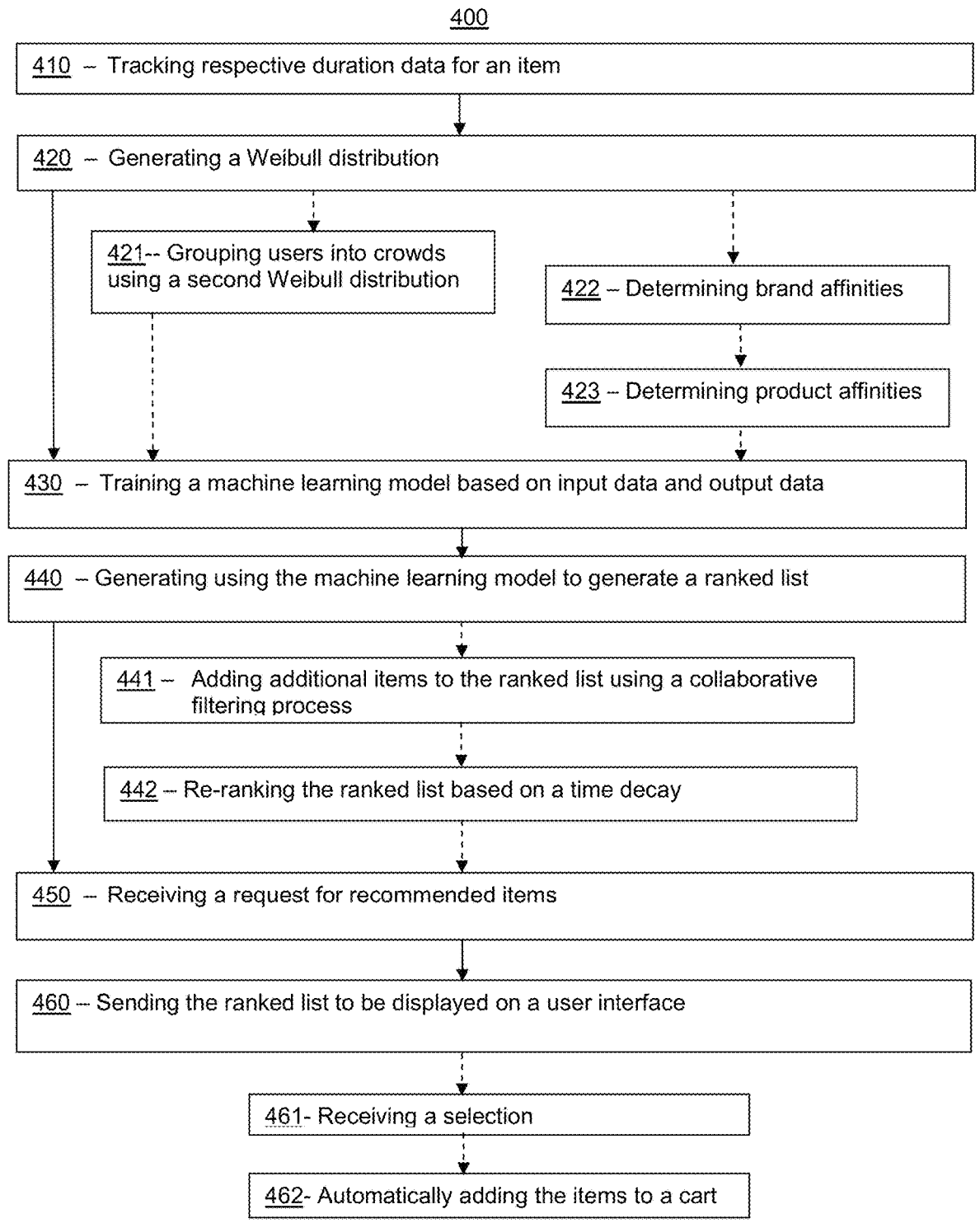
FIG. 4 illustrates a flow chart for a method, according to another embodiment.

Turning ahead in the drawings, FIG. 4 illustrates a flow chart for a method 400, according to another embodiment. In some embodiments, method 400 can be a method of automatically sending a list of regularly ordered items to a user (e.g., 350-351 (FIG. 3)) when a user visits a website of an online retailer. In many embodiments, the list of regularly ordered items can include a respective quantity for each item likely to be reordered on a given day. In various embodiments, the number of items in the list of regularly ordered items can be based on an average basket size of an order. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as smart basket system 305 and/or web server 320. The processor(s) can be similar or identical to the processor(s) described above with respect to computer system 100 (FIG. 1).

Referring to FIG. 4, method 400 can include a block 410 of tracking respective duration data for each respective item of items in a catalog based on purchase histories of the each respective item by users. In a number of embodiments, the respective duration data can include measuring a reorder rate for the each respective item within one or more first periods of time. In several embodiments, tracking duration data for an item can include tracking online orders including reordered items during a period of time for multiple users. In many embodiments, tracking duration data for an item can include determining a reorder rate for a quantity of the item ordered by multiple users. In several embodiments, tracking duration data for an item can be utilized as training data input into a machine learning model. In some embodiments, duration data for an item can be continuously tracked over a period of time creating new duration data that can represent current information for the item. In a number of embodiments, recently tracked duration data (e.g., new duration data) for an item can modify previous Weibull distributions for an item by increasing the precision of the predictive indications with up-to-date duration data. In various embodiments, new duration data can have new predictive indications to represent (i) a different date after an initial order a user will likely reorder the item and/or (ii) maintain a same date from previous Weibull distributions as accurate (e.g., more precise) over a period of time.

In some embodiments, block 410 of tracking respective duration data for each respective item of items in a catalog based on purchase histories of the each respective item by users can include determining the reorder rate for the each respective item of the items based on an average frequency at which the users order the each respective item using a website of the retailer. In many embodiments, a reorder rate can be based on an average frequency at which users order and/or reorder the each respective item over a period of time. In some embodiments, a reorder rate can be based on an average frequency of a number visits over a period of time at which a user and/or users visit the website. In many embodiments, a number of visits over a period of time can be based on tracking (e.g., monitoring) browse sessions and/or signals transmitted to a system each time a user logs in to a website.

In several embodiments, method 400 also can include a block 420 of generating a Weibull distribution for the each respective item using the respective duration data for the each respective item. In many embodiments, training data (e.g., duration data) for an item can be used as an input using a Weibull Probability Density function (Weibull PDF) model and the output can include a Weibull distribution for the item. In some embodiments, a Weibull distribution for an item can include a probability that an item will likely be reordered after "n" number of days. Generally, a Weibull distribution is a continuous probability distribution that is often used for reliability data analysis to model (e.g., predict) a variety of life behaviors. A Weibull distribution can model a frequency and probability of a behavior over time, such as a behavior of frequently reordering an item over time. In some embodiments, a Weibull distribution can model a frequency of a behavior and/or a pattern observed in multiple users. In various embodiments, a lifespan of an item can be a period of time when an item is most often consumed and/or based on an expiration date for an item. For example, bananas can expire after a six days if not consumed. Based on a Weibull distribution for bananas, if a period of ten (10) days was predicted based on the specific duration data of users reordering bananas over time, such a prediction can indicate that most users reordered bananas every 10 days even though bananas can expire after seven (7) days if not consumed, therefore the system can recommend bananas to a user every 10 days rather than every 7 days. As another example, yogurt can have an expiration date (e.g., lifespan) of seven (7) days and according to a Weibull distribution most users reordered yogurt after five (5) days prior to the expiration of the yogurt. In this example, yogurt can be added to the list of regularly ordered items every 5 days after reordering the yogurt instead of every 7 days when the expiration date for the previously ordered yogurt was set to expire.

In many embodiments, a Weibull distribution can generate one or more distribution patterns for an item indicating a range of dates of when the item was reordered by multiple users over a period of time. In some embodiments, a Weibull distribution for each item in a catalog of a retailer can be preprocessed (e.g., precomputed) on a regular (e.g., daily, weekly, or another suitable time period) basis by inputting current order transaction data into the Weibull probability density function model.

In various embodiments, block 420 of generating a Weibull distribution for the each respective item using the respective duration data for the each respective item further can be generated based on a seasonality feature for the each respective item. In some embodiments, generating a Weibull distribution for the each respective item can be further modeled on features based on a period of time, such as seasonality. In many embodiments, a time based feature can include converting a date into a week, a month, a year and/or another suitable period of time in which to track a season (e.g., a duration period), such as a spring, a summer, a fall, or a winter season, for example, or a holiday season, for example. In several embodiments, duration data used in a Weibull distribution can change over a period of time to account for a seasonality feature (e.g., peak harvest season) for an item. In some embodiments, a seasonality feature can represent a substantially higher (e.g., skewed) reorder rate (e.g., a potential higher demand) for the item during a particular season when an item is in season and/or in higher demand during a season. In many embodiments, a seasonality feature can represent a substantially lower (e.g., skewed) reorder rate (e.g., a potential lower demand) for an item during a particular season when an item is not in season and/or in lower demand during a season. For example, certain fruits, such as apples, can have seasonality peak time in the fall season where the demand for apples can be significantly increased resulting in a potentially shorter reorder period and/or reorder rate during a fall season. A different reorder rate also can mean generating a different Weibull distribution for apples that are in season and a different Weibull distribution for apples when not in season, thus apples can be added to a ranked list of recommendations more often during a peak harvest season.

In some embodiments, method 400 optionally can include a block 421 of grouping the users into crowds that can be based on demographic features of the users and determining a respective second Weibull distribution for each respective crowd of the crowds. In various embodiments, a second Weibull distribution can be generated for grouping users into crowds based on common demographic features of users, such as a geographical location such as a city, state, province, country, or another suitable geographical demographic category. For example, a crowd of users can be based on users living in a same neighborhood within a city. In some embodiments, grouping users into crowds also can be based on certain personal demographic features that are shared by a group of users, such as an age, a gender, or an ethnicity. For example, a crowd of users can be based on an age range of users, such as adults between ages 18 and 25, children under 5, or another suitable age range of users.

In many embodiments, items also can be grouped into groups (e.g., crowds) by certain item features, such as a product category, a department, a size, a price, and/or other features (e.g., attributes) that can be listed as attributes within a catalog of a retailer.

Figure 7:
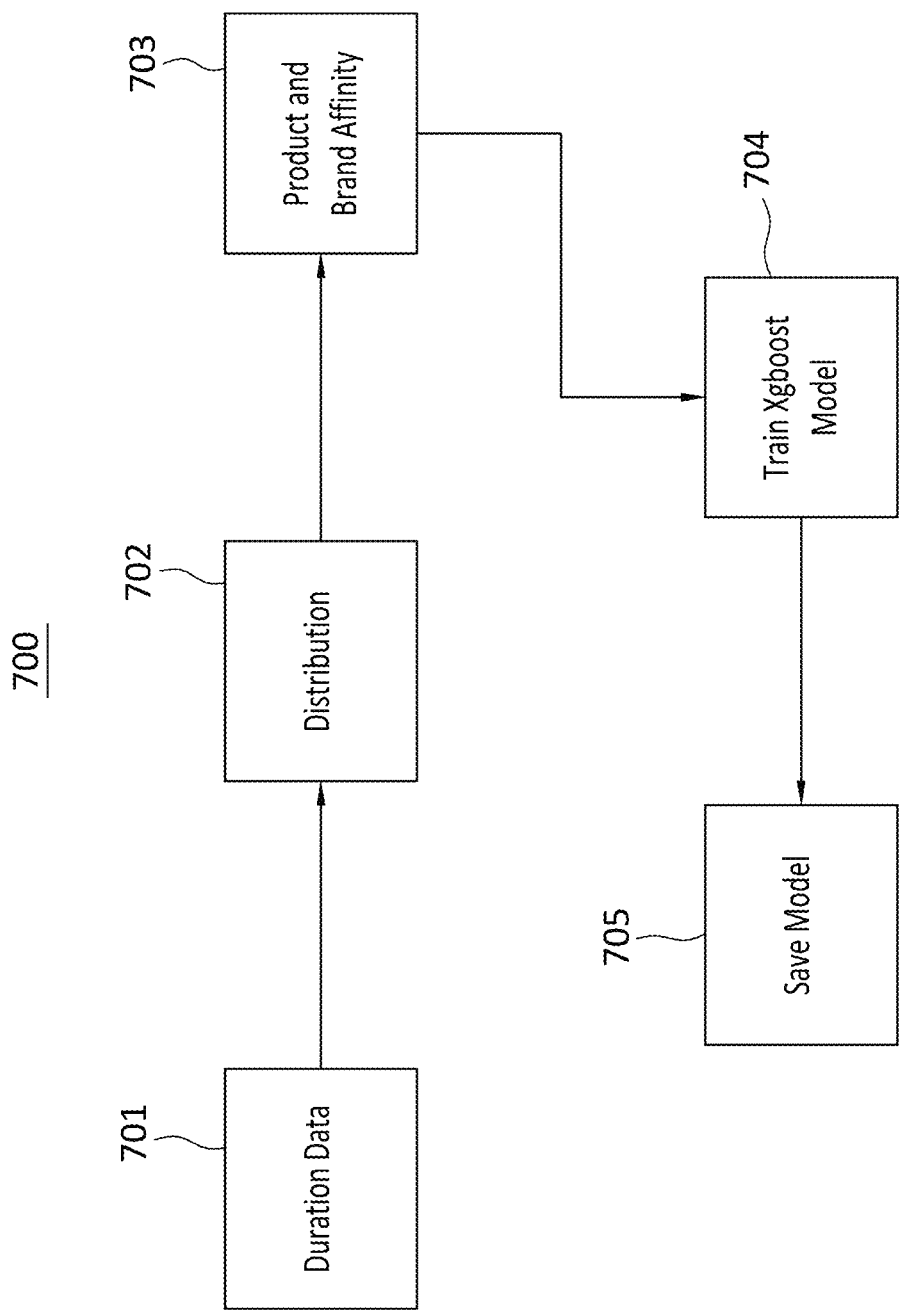
FIG. 7 illustrates a flow chart for a method, according to another embodiment.
Figure 8:
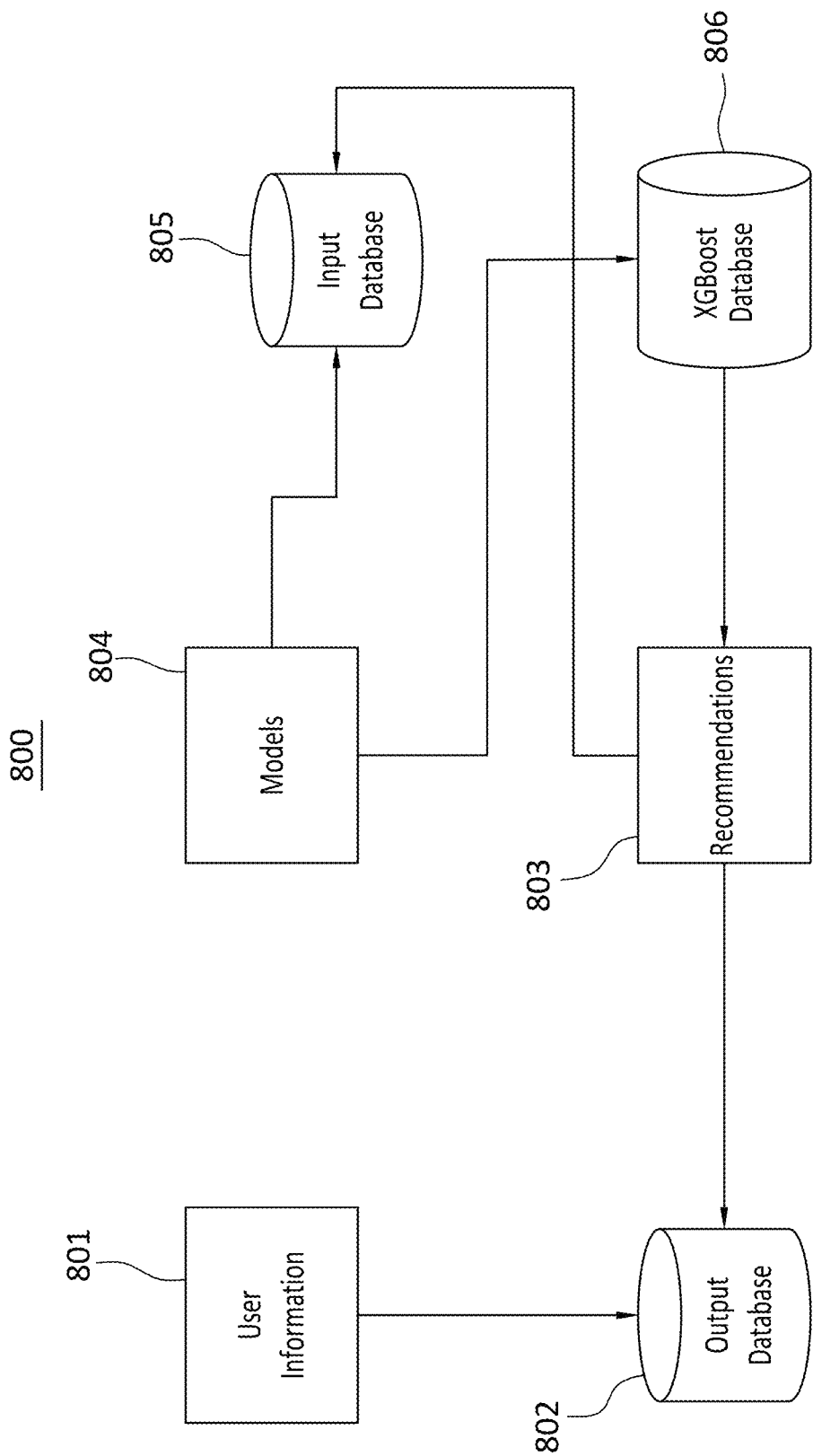
FIG. 8 illustrates a flow chart for a method, according to another embodiment.

In several embodiments, method 400 optionally can include a block 422 of determining the brand affinities for the respective user based on at least the purchase histories within the one or more first periods of time. In many embodiments, determining a brand affinity for a user (e.g., a brand of an item a user in inclined to purchase) can be generated using previous order histories that can include a number of times a brand of an item has been reordered over another brand of the item, such as a generic brand of a retail store, over a period of time (e.g., six months, a year, or another suitable period of time). In various embodiments, determining a brand affinity of a user for an item can include determining that a number of times a brand of an item was reordered within a period of time exceeded a predetermined threshold. In several embodiments, training a machine learning model can include using various types data as input, including a Weibull distribution for an item and brand affinity of a user for the item, as shown in FIGS. 7-8 and described below.

In various embodiments, method 400 further optionally can include a block 423 of determining the product affinities for the respective user based at least on (i) the purchase histories, and (ii) product type data of the item within the one or more first periods of time. In a number of embodiments, the product type data can be determined by categorizing the item as a product type. In many embodiments, determining a product affinity for a user (e.g., a product type of an item that a user is inclined to purchase) can include determining a preference of the user for a product type of an item. In some embodiments, a product affinity for a product type of an item can be generated using previous order histories that can include a number of times a product type of an item has been reordered over another product type of the item over a period of time (e.g., six months, a year, or another suitable period of time). In many embodiments, determining a product affinity of a user for an item can include exceeding a predetermined threshold of a number of times a product type of an item was reordered within a period of time. In several embodiments, training a machine learning model can include using various types data as input, including a Weibull distribution for an item and product affinity of a user for the item, as shown in FIGS. 7-8 and described below.

In some embodiments, block 423 of determining the product affinities for the respective user also can include using product type data of the item within the one or more first periods of time. In several embodiments, product type data also can be determined by categorizing the item as a product type.

In many embodiments, method 400 additionally can include a block 430 of training a machine learning model based on previous orders by the users. In several embodiments, the machine learning mode can be trained, such that, for each respective order of the previous orders by a respective user of the users, (a) input data for the machine learning model comprises the Weibull distribution for the each respective item of the items, brand affinities for the respective user, and product type affinities for the respective user, and (b) output data for the machine learning model comprises respective indications of whether the respective user ordered the each respective item, respective quantities associated with the each respective item, and a basket size of the each respective order. In some embodiments, an output data for a machine learning model, as trained, can be personalized to each user. The Weibull distribution can be the Weibull distributed generated in block 420. The brand affinities can be the brand affinities determined in block 422. The product affinities can be the product affinities determined in block 423.

In various embodiments, the output of a machine learning model, as trained, can be adjusted by an average frequency of visits to the website of a user. An average frequency of visits can include a number of times over a period of time when the user logs on to a website to order items (e.g., per day, per week, month, six months, and/or any other suitable time period). For example, an average frequency of visits for a user can be every ten (10) days. In that scenario, the system can adjust the list of items to retain top items on the list using a decay function, such as described below in connection with block 442.

In a number of embodiments, the machine learning model can include a gradient boosting model. In some embodiments, a gradient boosting model can include an XGBoost model and/or another suitable gradient boosting model. In some embodiments, the gradient boosting model can be implemented through the XGBoost open source software package written in Python. In many embodiments, the historical input data can be input into the gradient boosting model for training as input patterns (X) in XGBoost, and the output data can be input into the gradient boosting model for training as output patterns (Y) in XGBoost. This input data and output data for training can be used to train the gradient boosting model using a classification model in XGBoost, such as XGBClassifier, which can be created and fit to the training data.

In some embodiments, a number of parameters can be used to train the model and tune the model to fit the training data. For example, the number of decision trees, the size of the decision trees, the maximum depth of each decision tree, and/or other suitable parameters can be tuned to train the gradient boosting model. In many embodiments, historical data not included in the training data can be used as test data to test and tune the gradient boosting model.

In various embodiments, a machine learning model approach (e.g., an ensemble machine learning algorithm) can build a core prediction for an item then by using a gradient boosting model (e.g., XGBoost) can add a boost (e.g., increase the accuracy of the predictive model) to the core prediction. In some embodiments, adding a boost to the core prediction can be performed by adding an additional layer (e.g., features) at a time to the core prediction using an iterative process. In various embodiments, the output for the machine learning approach can include whether the item is likely to be reordered or not. In many embodiments, the output of whether an item is likely to be reordered can be scored using a range from 0 or 1. In some embodiments, the output score of 1 can indicate that the user is highly likely to reorder score within the time period, and the output score of 0 can indicate that the user is highly unlikely to reorder score within the time period. Generally, the output score will be somewhere in the range of 0 to 1.

In a number of embodiments, a core prediction can be personalized to a user by adding one or more user features (e.g., layers), such as a city, an age, a gender, a number of children, and/or other suitable features to boost the core prediction for the item. In many embodiments, a set of features (e.g., a set of layers) also can include a Weibull probability for an item, a product affinity, a brand affinity, a season, and/or other suitable features, to add a boost to the core prediction. For example, a core prediction (e.g., a Weibull distribution, product affinity, and/or brand affinity) that a user will reorder grapes on a given day can be made more precise and/or accurate when another feature (e.g., layer) is added to the core prediction as another layer of input information, such as a seasonality for grapes.

In some embodiments, method 400 further can include block 440 of generating, using the machine learning model, as trained, a ranked list of one or more first items for a user of the users, a respective predicted quantity for each of the first items, and an average basket size for the user. In a number of embodiments, the ranked list of regularly ordered items can be ranked in an order, such as starting from a top positon on the list (e.g., a highest probability for reordering an item) to a lower position (e.g., a lower probability for reordering an item), based on an output of the machine learning model. In several embodiments, the ranked list can retain items when a new list is presented on a new visit to the website. In many embodiments, if a new list of ranked items includes an item that was on the previous list, the item can be ranked differently on the list. In some embodiments, the ranked list also can retain an item by applying a time decay feature (e.g., time decay function) to the item, as further described below in connection with block 442.

In many embodiments, the order of an item in the ranked list on a given day can change each time a new list is created for the given day based on the machine learning model, as trained. In some embodiments, a list of items generated using a machine learning model, as trained, can be based on a probability that the user will reorder all of the items in the particular list of ranked items by adding the entire list of items to a cart on a given day. In many embodiments, when a user orders less than all of the items on the list of ranked items, the items that were not added from the ranked list can be used as additional training data for the machine learning model.

In some embodiments, block 440 can output a quantity of items most likely to be reordered by the user, which can be determined based on previous order history data of multiple users over a predetermined period of time. In various embodiments, determining a quantity of an item most liked to be reordered can include calculating a number of times the item was reordered within a set of order history within a period of time. In some embodiments, the output data, for the machine learning model, as trained, can output a probability that a user will order "n" number of items on a given day.

In some embodiments, block 440 can output an average basket size of an order for the user, which can be used to determine how many items to list on a ranked list to be sent to the user. For example, if an average basket size of an order is 50 items, the system can determine a number of items to add to the ranked list based on a predetermined number for an average basket size of 50 items to allow for new items to be added to the basket (e.g., cart). In many embodiments, determining an average basket size of an order can include calculating a number of items in each basket (e.g., order) of the user over a period of time.

In many embodiments, method 400 optionally can include a block 441 of adding one or more additional items to the ranked list by using a collaborative filtering process, as described below in further detail in FIG. 5.

In some embodiments, method 400 further optionally can include block 442 of, after generating the ranked list of the one or more first items for the user, reranking the ranked list of the one or more first items using a time decay based on at least an average frequency of the respective user initiating an order using a website of the retailer. In several embodiments, a time decay can be a time decay feature or a time decay factor that can add a second time period to an item regularly reordered, which can allow the item to either remain the next ranked list and/or increased the position of the item on the ranked list as other items fall off the list over time. In many embodiments, additional weight (e.g., more importance) can be allotted to an item on the ranked list based on how recently the item was ordered and/or how frequently the item was reordered based on previous orders. In some embodiments, an item that was recently ordered can be listed in a position higher on the ranked list. In several embodiments, an item has been reordered more frequently than other items on a list also can be listed in a position higher on the ranked list.

In several embodiments, an average frequency of visits to a website can influence whether a time decay can be added to an item on a ranked list to allow the item to remain on the list longer until the user visits the website based on an average frequency of visits. In some embodiments, an average frequency rate of user visits to a website can be measured by tracking a number of visits by a user to a website over a predetermined period of time indicating a frequency rate of a user exists (e.g., a behavior or pattern of use). In some embodiments, determining a frequency rate can include monitoring a number of visits to a website over a predetermined period of time of a user and/or users, such as user 350-351 (FIG. 3), such as daily, twice a week, every ten (10) days, and/or another suitable period of time.

In several embodiments, when an item involves a second period of time to remain on the ranked list, the time decay can be applied to the ranked list for that item. In several embodiments, the time decay factor can be added to an item that is a frequently reordered item more than other items on the list to allow the item to remain on the list until the user visits the website. For example, a user visits the website every ten (10) days and frequently reorders milk at each visit. Milk has a Weibull distribution of seven (7) days and a machine learning model, as trained, determined a probability that a user would reorder milk 7 days after the initial order, thus milk would be added to the ranked list of items on day 7. In this example, a time decay factor can be added to the milk to keep the milk higher on the ranked list of items by adding a second period of time for the milk and retaining the milk on the list until day 10 when the user visits the website.

In various embodiments, an item on a ranked list of items can be moved down the list after a predetermined period of time and/or can be removed in favor of other regularly ordered items according to a machine learning model, as trained. In some embodiments, a first item with a time decay factor can act can as an override to the system by allowing other items to drop off the list over a period of time and reranking the ranked list of items by moving the first item higher on the ranked list of items than other and/or additionally added items.

In various embodiments, method 400 additionally can include block 450 of receiving a request for recommended items from the user using a user interface provided by a retailer. In some embodiments, receiving a request for recommended items can include a request for regularly ordered items and/or recommended items that are similar or complementary to a regularly ordered item. In several embodiments, receiving a request can be based on the user selecting a typeahead search query on a user interface that lists an option for selecting recommended items, which can result in automatically listing the current ranked list of items on a given day during a given visit to the website.

In many embodiments, block 450 of receiving a request for recommended items from the user using a user interface provided by a retailer can include receiving the request for the recommended items from the user based on the user selecting a typeahead query within the user interface of the user. In several embodiments, the typeahead query can include a typeahead service that can be automatically installed on a user device. In some embodiments, a typeahead query can be presented to a particular crowd of users that have been determined to be eligible based on a Weibull distribution of user features (e.g., as generated in block 421 (FIG. 4)). In several embodiments, a particular crowd with a Weibull distribution can include inputs, such as user demographics, a history of frequent visits to a website, a history of reordering items and/or other user demographics shared by the particular crowd.

Figure 9:
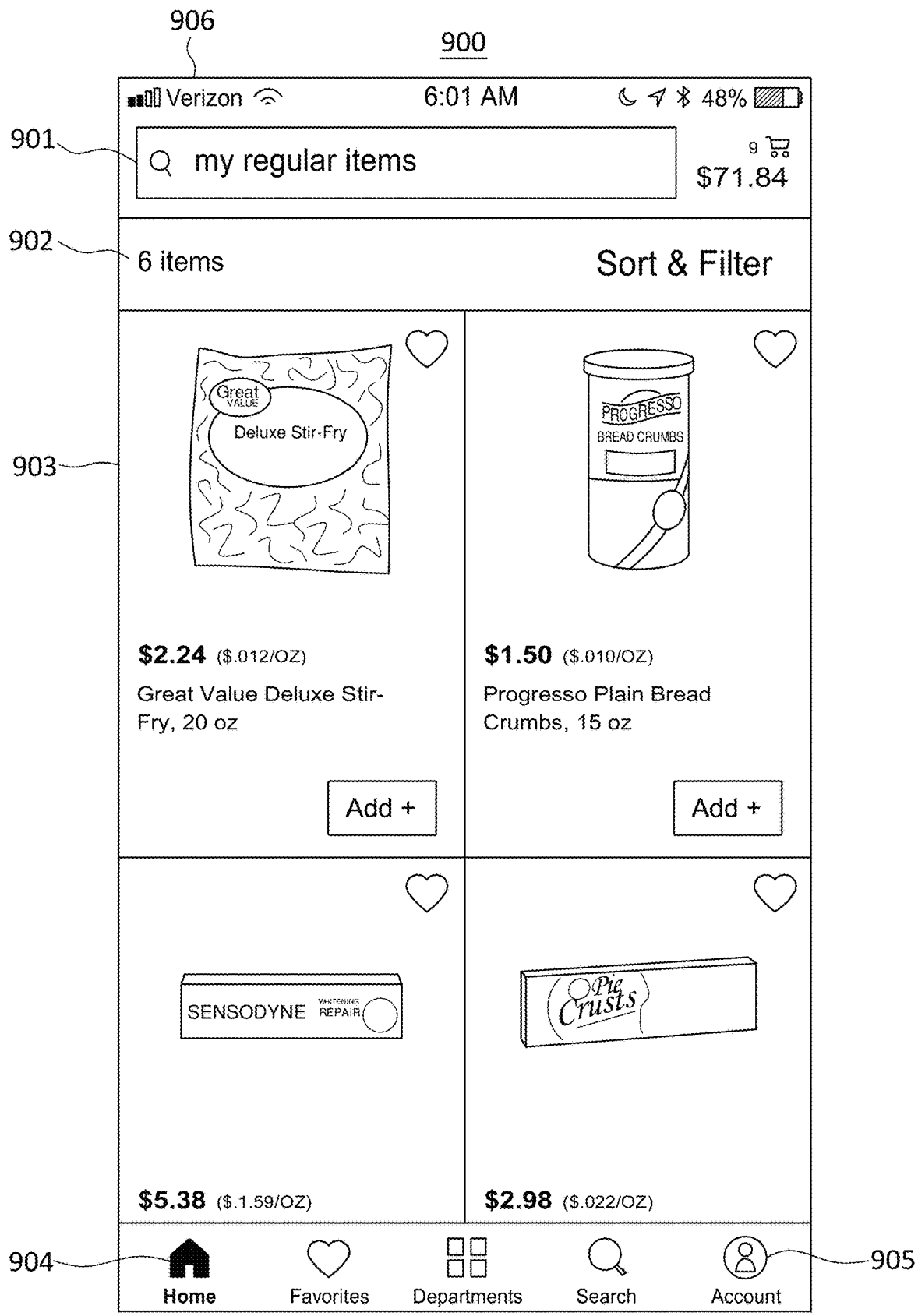
FIG. 9 illustrates an exemplary user interface showing a webpage of a website.

In many embodiments, a typeahead query can be implemented on a user interface of a user device when the user visits the website and performs a keystroke and/or swipes on a character on a keypad on the user interface. A typeahead query, as selected, can show a suggested query in the user interface on the website, such as "My Regular Items," as shown in FIG. 9 and described below in further detail. In various embodiments, a selection by a user of a suggested query on a website, such as "My Regular Items," can automatically list the ranked list of items for the given day of the visit for the user. In many embodiments, a user can add the entire list to a cart and/or parts of the list to a cart. In several embodiments, the information about whether the user adds the entire list or only parts of the list to the cart can be used as updated training data for the machine learning model and/or a new Weibull distribution for the items, which can affect the ranked list for the user in future visits.

In various embodiments, a typeahead query can include a typeahead integration approach. In many embodiments, a typeahead integration approach can begin with loading an eligible list of users into a database, then when an eligible user visits the website, the typeahead query can automatically present a suggested query (e.g., a ranked list of items) stored in a database personalized for the user.

In some embodiments, method 400 further can include a block 460 of sending the ranked list of the one or more first items to be displayed on the user interface. In a number of embodiments, block 460 can be performed responsive to the request received in block 450. In several embodiments, a ranked list of one or more first items can be retrieved from a database. In many embodiments, the output generated by a machine learning model, as trained, can be stored in a database and personalized for a user. In some embodiments, an integrated database can be updated by periodically batching new information related to the user and the details of the frequently ordered items during a set period of time, which can include updating the latest order history each day, each week, and/or during any other suitable time frequency. In many embodiments, the output for a user can be preprocessed and stored into a database that can be accessed for data associated with each user.

In various embodiments, a database can be integrated by including at least two signals to retrieve information for (i) a list of users and (ii) a details of frequently ordered items of the user. In many embodiments, an integrated database can generate a first signal in the database that can include a list of eligible users with user devices enabled with a typeahead service, such as "My Regular Items." For example, a first signal can be written as "smbasket_eligible-cust," which can identify the list of eligible users in the database. In some embodiments, an integrated database can include a second signal in the database the can include details of frequently reordered items updated with current order information for each user. For example, a second signal can be written as "key-customer_id" to identify the item details for a user including an average basket size for each visit, a list of items for the ranked list of items, and a quantity of each item on the ranked list of items to be presented to a user interface on a given day.

In several embodiments, method 400 optionally can include a block 461 of receiving a selection, from the user interface, of one or more selected items of the one or more first items in the ranked list. In many embodiments, the user can select the one or more selected items on the user interface that presents the ranked list In some embodiments, method 400 further optionally can include a block 462 of automatically adding the one or more selected items to a cart of the user. In several embodiments, after automatically adding one or more of the selected items to a cart, a user can check out the items for purchase and/or continue adding new items to a cart.

Figure 5:
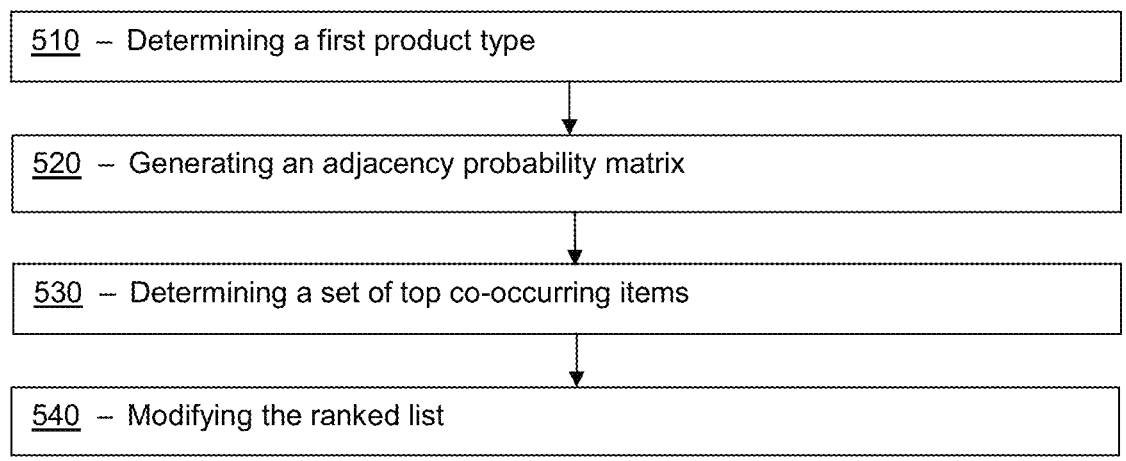
FIG. 5 illustrates a flow chart for a block of adding one or more additional items to the ranked list by using a collaborative filtering process, according to the embodiment of FIG. 4.

Turning ahead in the drawings, FIG. 5 illustrates a flow chart for block 441 of adding one or more additional items to the ranked list by using a collaborative filtering process, according to the embodiment of FIG. 4. In many embodiments, adding one or more recommended items to a cart can be transmitted by adding the recommended items to the ranked list. In several embodiments, adding the recommended items to the ranked list can be highlighted as new items. Block 441 is merely exemplary and is not limited to the embodiments presented herein. Block 441 can be employed in many different embodiments or examples not specifically depicted or described herein. In some embodiments, the procedures, the processes, and/or the activities of block 441 can be performed in the order presented. In other embodiments, the procedures, the processes, and/or the activities of block 441 can be performed in any suitable order. In still other embodiments, one or more of the procedures, the processes, and/or the activities of block 441 can be combined or skipped.

In some embodiments, block 441 can include a collaborative filtering approach that can be used to address a cold start problem, in which an item in a catalog has an insufficient amount of information for generating recommendations for the item. In some embodiments, an insufficient amount of information can occur where data for an item cannot be based on a significant amount of previous orders and/or previous transactions. In several embodiments, a cold start problem can occur for a new product, new brand, or another product newly added to a catalog.

Referring to FIG. 5, block 441 can include a block 510 of determining a first product type that is most common among product types associated with the one or more first items. In several embodiments, the collaborative filtering approach can include searching preferences and/or interests of other users that regularly reorder an item to predict a similar and/or complementary item that can be recommended to a user when the regularly reordered item is presented on the ranked list of items. In various embodiments, collaborative filtering can be used to recommend an item that is not part of the ranked list but is sometimes ordered along with the reordered item. For example, a user regularly reorders bacon on the ranked list of items. Based on previous order histories and/or previous items found in baskets of users that ordered bacon, a collaborative filtering process can recommend and/or suggest a certain brand and/or quantity of eggs to the user where eggs were not previously ordered by the user.

In several embodiments, method 500 also can include a block 520 of generating an adjacency probability matrix for all items in the first product type such that a cell at a row and a column of the adjacency probability matrix can represent a probability of an item that can be represented by the row being ordered together with an item that can be represented by the column. In some embodiments, a probabilistic approach based on previous order history can solve a cold start problem for an item. In many embodiments, collaborative filtering can use previous purchase history data to create the adjacency matrix to find nearest matches of another item to recommend for an item currently on the ranked list of items. Such an approach can address the cold start problem for some items. In some embodiments, the collaborative filtering approach can begin by clustering users based on query logs, then training the collaborative filtering model corresponding to each cluster of users by adding, a percentage of items from collaborative filtering model to the item order (e.g., purchase) history of a user. In many embodiments, a percentage of items from collaborative filtering model added to the user order history can be items not previously ordered by the user.

In some embodiments, method 500 additionally can include a block 530 of determining a set of top co-occurring items in the first product type based on the adjacency probability matrix. In several embodiments, generating a set of co-occurring global product types (GPT) can involve constructing the adjacency probability matrix (e.g., a GPT probability matrix) using previous order history. For example, a probability for whether milk and eggs can be recommended to a user can be generated by taking a number of orders in the previous order history, including GPTs for milk and eggs, then dividing by a number of orders having a GPT for eggs, only.

$$Prob(\text{Milk/Eggs}) = \frac{\text{Number of orders for } GPTs \text{ for milk and eggs}}{\text{Number of orders for } GPT \text{ for eggs}} \quad (1)$$

Table 1 below shows an exemplary adjacency matrix, which can be used to find a top number of GPTs ordered most frequently together with a given GPT. In many embodiments, using the collaborative filtering approach can involve determining one or more items to add based on previously ordered items by other customers.

TABLE 1

An Exemplary Adjacency Matrix

| | GPT 1 | GPT 2 | ... | GPT N |
|---|---|---|---|---|
| GPT 1 | — | 0.5 | ... | 0.3 |
| GPT 2 | 0.9 | — | ... | 0.5 |
| ... | | | — | |
| GPT N | 0.6 | 0.2 | ... | — |

In various embodiments, method 500 further can include a block 540 of modifying the ranked list by adding the one or more of the set of top co-occurring items as the one or more additional items. In several embodiments, the collaborative filtering system for the cold start item can begin with calculating GPT with a greatest number of items (e.g., an initial list) in a ranked list of items, generated by a machine learning model, as trained, then finding a top number of co-occurring GPTs with a GPT of an item on the ranked list. When a co-occurring GPT is present in the ranked list of items, the collaborative filtering approach can include boosting a rank of items of the top number of co-occurring GPTs with the GPT of the item to increase precision of the list of ranked items to recommend to the user.

In a number of embodiments, when a co-occurring GPT is not present in an initial list of GPTs with a greatest number of items, the collaborative filtering approach can increase a probability of ordering the recommend item by adding the item from this new set of GPTs to the ranked list for a user. In some embodiments, an advantage of using a collaborative filtering system to add additional co-occurring items for an item on a ranked list can increase precision of the output generated by using a machine learning model, as trained, by improving a ranking (e.g., reranking) of the items in a ranked list of items (e.g., items highly likely to be ordered together).

Figure 6:
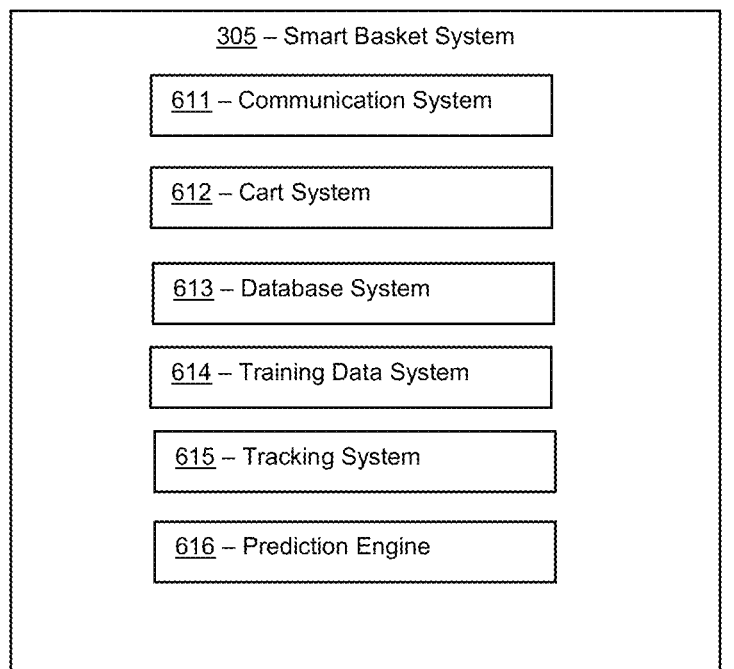
FIG. 6 illustrates a representative block diagram for the system of FIG. 3.
Figure 6:
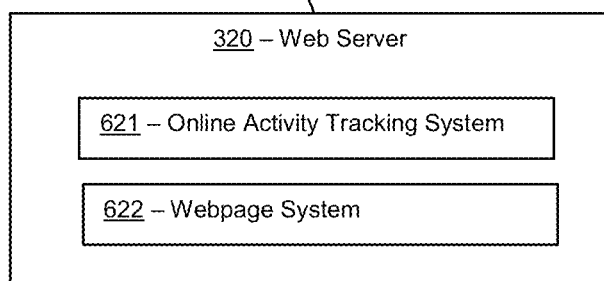

Turning to the next drawing, FIG. 6 illustrates a block diagram of system 300, according to the embodiment shown in FIG. 3. Smart basket system 305 and/or web server 320 are merely exemplary and are not limited to the embodiments presented herein. Smart basket system 305 and/or web server 320 can be employed in many different embodiments or examples not specifically depicted or described herein. In some embodiments, certain elements or systems of smart basket system 305 and/or web server 320 can perform various procedures, processes, and/or acts. In other embodiments, the procedures, processes, and/or acts can be performed by other suitable elements or systems. In many embodiments, the systems of smart basket system 305 and/or web server 320 can be modules of computing instructions (e.g., software modules) stored at non-transitory computer readable media. In other embodiments, the systems of smart basket system 305 and/or web server 320 can be implemented in hardware.

In many embodiments, smart basket system 305 can include a communication system 611. In a number of embodiments, communication system 611 can at least partially perform block 410 (FIG. 4) of tracking respective duration data for each respective item of items in a catalog based on purchase histories of the each respective item by users, block 450 (FIG. 4) of receiving a request for recommended items from the user using a user interface provided by a retailer, receiving the request for the recommended items from the user based on the user selecting a typeahead query within the user interface of the user, block 460 (FIG. 4) of sending the ranked list of the one or more first items to be displayed on the user interface, block 461 (FIG. 4) of receiving a selection, from the user interface, of one or more selected items of the one or more first items in the ranked list, and/or block 701 (FIG. 7) of receiving duration data.

In several embodiments, smart basket system 305 also can include a cart system 612. In various embodiments, cart system 612 can at least partially perform block 462 (FIG. 4) of automatically adding the one or more selected items to a cart of the user.

In some embodiments, smart basket system 305 also can include a database system 613. In many embodiments, database system 613 can at least partially perform block 420 (FIG. 4) of generating a Weibull distribution for the each respective item using the respective duration data for the each respective item, block 440 (FIG. 4) of generating, using the machine learning model, as trained, a ranked list of one or more first items for a user of the users, a respective predicted quantity for each of the first items, and an average basket size for the user, block 460 (FIG. 4) of sending the ranked list of the one or more first items to be displayed on the user interface, the one or more first items in the ranked list are based on a respective day in which the request is received, block 422 (FIG. 4) of determining the brand affinities for the respective user based on at least the purchase histories within the one or more first periods of time, block 423 (FIG. 4) of determining the product affinities for the respective user based at least on (i) the purchase histories, and (ii) product type data of the item within the one or more first periods of time, the product type data determined by categorizing the item as a product type, and/or block 705 (FIG. 7) of saving the XGBoost model in a database.

In various embodiments, smart basket system 305 also can include a training data system 614. In many embodiments, training data system 614 can at least partially perform block 420 (FIG. 4) of generating a Weibull distribution for the each respective item using the respective duration data for the each respective item, block 430 (FIG. 4) of training a machine learning model based on previous orders by the users, block 510 (FIG. 5) of determining a first product type that is most common among product types associated with the one or more first items, block 421 (FIG. 4) of grouping the users into crowds that can be based on demographic features of the users and determining a respective second Weibull distribution for each respective crowd of the crowds, block 422 (FIG. 4) of determining the brand affinities for the respective user based on at least the purchase histories within the one or more first periods of time, block 423 (FIG. 4) of determining the product affinities for the respective user based at least on (i) the purchase histories, and (ii) product type data of the item within the one or more first periods of time, the product type data determined by categorizing the item as a product type, block 702 (FIG. 7) of generating a distribution, block 703 (FIG. 7) of determining a product and/or a brand affinity of a user and/or block 704 (FIG. 7) of training an XGBoost model.

In a number of embodiments, smart basket system 305 also can include a tracking system 615. In many embodiments, tracking system 615 can at least partially perform block 410 (FIG. 4) of tracking respective duration data for each respective item of items in a catalog based on purchase histories of the each respective item by users, block 420 (FIG. 4) of generating a Weibull distribution for the each respective item using the respective duration data for the each respective item, block 510 (FIG. 5) of determining a first product type that is most common among product types associated with the one or more first items, block 530 (FIG. 5) of determining a set of top co-occurring items in the first product type based on the adjacency probability matrix, block 702 (FIG. 7) of generating a distribution, block 703 (FIG. 7) determining a product and/or a brand affinity of a user and/or block 704 (FIG. 7) of training an XGBoost model.

In several embodiments, smart basket system 305 also can include a prediction system 616. In many embodiments, prediction system 616 can at least partially perform block 410 (FIG. 4) of tracking respective duration data for each respective item of items in a catalog based on purchase histories of the each respective item by users, block 420 (FIG. 4) of generating the Weibull distribution for the each respective item using the respective duration data for the each respective item, block 421 (FIG. 4) of grouping the users into crowds that can be based on demographic features of the users and determining a respective second Weibull distribution for each respective crowd of the crowds, block 422 (FIG. 4) of determining the brand affinities for the respective user based on at least the purchase histories within the one or more first periods of time, block 423 (FIG. 4) of determining the product affinities for the respective user based at least on (i) the purchase histories, and (ii) product type data of the item within the one or more first periods of time, the product type data determined by categorizing the item as a product type, block 440 (FIG. 4) of generating, using the machine learning model, as trained, a ranked list of one or more first items for a user of the users, a respective predicted quantity for each of the first items, and an average basket size for the user and further comprising a gradient boosting model, block 441 (FIG. 4) of adding one or more additional items to the ranked list by using a collaborative filtering process, 530 (FIG. 5) of determining a set of top co-occurring items in the first product type based on the adjacency probability matrix, and/or block 704 (FIG. 7) of training an XGBoost model.

In a number of embodiments, web server 320 can include an online activity tracking system 621. In many embodiments, online activity tracking system 621 can at least partially perform gathering information regarding online orders, which can be provided to tracking system 615.

In several embodiments, web server 320 can include a webpage system 622. Webpage system 622 can at least partially perform sending instructions to user computers (e.g., 350-351 (FIG. 3)) based on information received from communication system 611.

Turning ahead in the drawings, FIG. 7 illustrates a flow chart for a method 700, according to another embodiment. Method 700 can be similar to method 400 (FIG. 4).

In many embodiments, method 700 can begin with a block 701 of receiving duration data. In many embodiments, duration data can be a period of time when an item is most often reordered by users. Such duration data for an item can be measured by reorder rates of each item based on previous order histories of users. In various embodiments, duration data can include a number of days and/or another suitable period of time before a user reorders an item previously ordered. In a number of embodiments, method 700 can continue with a block 702 of generating a distribution, which can represent a distribution of days before an item is consumed (e.g., a Weibull distribution) for the item. Such a distribution can indicate a number of days in which most users reorder the item. For example, an item such as yogurt can be reordered anytime within or past an expiration date for the yogurt. By using a distribution 702, a system can use this information as input into a machine learning model to predict when a user will most likely reorder the item on a given day. For example, if yogurt expires within ten (10) days after it was ordered, a Weibull distribution can indicate that most users reorder the item every seven (7) days. Such information can be refined further and personalized for a user by adding additional layers of information, such as user features and user demographics, to determine when to add the item to the ranked list.

In a number of embodiments, method 700 can continue with a block 703 of determining a product and/or a brand affinity of a user, which can be used as training data (e.g., input) for a machine learning model to learn when a user will most likely reorder an item.

In several embodiments, method 700 can continue with a block 704 of training an XGBoost model, which can predict whether a user will order the item on a given day or not. In several embodiments, the XGBoost model can be a machine learning model, which can continuously learn from updated input data, which can include data from historical user orders (e.g., previous orders), such as duration data (e.g., such as tracked in block 410 (FIG. 4)), product affinity (e.g., such as determined in block 430 (FIG. 4)), and/or brand affinity (e.g., such as determined in block 430 (FIG. 4)), and can generated output such as a likely quantity of the item, when a user will likely reorder an item on a given day. In many embodiments, historical user orders can include several hundred thousand, a million, and/or more than a million of orders for a single item by users over a period of time. In several embodiments, the data stored in the historical user orders can be used as training data and/or input data to train a suitable machine learning model. In some embodiments, the historical user orders can include recent orders that are added to the historical user orders each time the dataset is updated and/or refreshed periodically. In various embodiments, the data used as training data stored in historical user orders can include various features, such as city, age, gender, a family size, a Weibull distribution, a product affinity, a brand affinity, and/or another suitable feature.

In many embodiments, method 700 can continue with a block 705 of saving the XGBoost model in a database. In many embodiments, the predictive indications of a reorder date for an item can be preprocessed, updated on a periodic basis for user (e.g., one day, two days, one week or any other suitable period of time), and stored in a database.

Turning ahead in the drawings, FIG. 8 illustrates a flow chart of method 800, according to another embodiment. Method 800 can be similar to method 400 (FIG. 4).

In some embodiments, method 800 can involve user information 801 being stored in an output database 802. User information 801 can be information about users that have sufficient purchase history such that predicting the smart basket is enabled for those users. In a number of embodiments, output database 802 can be a master database and/or a database storing preprocessed predictive indications of an item that a user will most likely reorder on a given day as generated by a machine learning model, as trained. In several embodiments, recommendations 803 can be generated using XGBoost model stored in XGBoost database 806, and can generate recommendations on a periodic basis, such as each day, every two days, a week or another suitable period of time. In various embodiments, user input 803 can be updated and transmitted to output database 802.

In several embodiments, method 800 can involve models 804 being generated, which can be similar or identical to method 700 (FIG. 7). The models can be trained using distribution input, that can include multiple inputs for a machine learning model, such as a Weibull distribution for an item, a product affinity, a brand affinity, a quantity associated with the item, user features and demographics and any other suitable types of personalization features to add as another layer (e.g., input feature) that can refine core predictions generated by the machine learning model. Models 804 can be stored in XGBoost database 806. In many embodiments, models 804 can be generated and/or updated on a period basis, such as weekly, biweekly, or at another suitable frequency. In many embodiments, the models and/or recommendations can be stored in an input database 805, which can be used to provide the recommendations to the user, upon the user requesting the recommendations.

In many embodiments, method 800 can illustrate an end-to-end process using a machine learning model to generate a list of items to recommend to the user, which can include items that the user will likely reorder on a given day. In several embodiments, each time a user visits a website and selects the typeahead query, for example, the most current list of ranked items can be automatically displayed on a user interface to the user. In many embodiments, the list of ranked items also can be automatically added to a cart of a user as a reordered item.

Turning ahead in the drawings, FIG. 9 illustrates an exemplary user interface display 900 showing a webpage of a website. User interface display 900 is merely exemplary, and embodiments of smart basket recommendations for online items can be employed in many different embodiments or examples not specifically depicted or described herein. In several embodiments, user interface display 900 can include a search bar 901, a counter indicator 902, a list 903 of ranked items, a homepage icon 904, and/or an account icon 905.

In various embodiments, search bar 901 can indicate that the user has engaged in a keystroke or swipe of the user interface as indicated by the automatic loading of a typeahead query presented in the search bar, such as "My Regular Items." In several embodiments, a upon selection of the typeahead, by touching any key on the user interface, the typeahead automatically adds a ranked list of items generated by a machine learning model, as trained, for the user on the given day, as described above in further detail. In several embodiments, upon selection of the typeahead, by touching any key on the user interface, the typeahead can automatically add a ranked list of items generated by a machine learning model, as trained, and a list of recommended items for the items on the ranked list for a user on a given day, as described above in further detail.

In many embodiments, counter indicator 902 can indicate a current number of items that are displayed in list 903 of ranked items. In several embodiments, list 903 of ranked items can be larger than the number of images that can be displayed at one time on a specific screen size of the user interface. In many embodiments, the user can use a scrolling feature on the user interface to view the entire ranked list of items on the user interface.

In a number of embodiments, homepage icon 904 can allow the user to access a homepage of the website. In several embodiments, when the user wants to return to a homepage of a website, the user can select homepage icon 904.

In some embodiments, account icon 905 can be displayed on a user device (e.g., 340-341 (FIG. 3)) of a user (e.g., 350-351 (FIG. 3)). In many embodiments, account icon 905 can be used to access account information personalized to the user.

Conventionally, many users frequently visit a website to order items on a regular basis. Generally, a user can add more than 50 items to a cart during for a single online order. Of those more than 50 items ordered, more than 60 percent can be regularly ordered items that are frequently reordered periodically. Each item of the more than 50 items can be selected from one webpage at a time. An advantage of using the machine learning model, as trained, can be appreciated when a user opens a homepage of a website and a list of regularly ordered items personalized to the user can be added to a cart without the user searching for each item on the website. Another advantage of using the machine learning model, as trained, is that the training data for the machine model can include data from previous users orders (e.g., order history), that can include several hundred thousand, a million, and/or more than a million of orders for a single item by users over a period of time.

In many embodiments, the techniques described herein can provide several technological improvements. In various embodiments, one advantage of using a machine learning model, as trained, for each item is based on a continuous learning approach whereupon the machine learning model can continually learn from every iteration generated as output data thereby improving upon the precision and reliability of each prediction for each item. Another advantage in using a machine learning model is continuous updates of the training data (e.g., input data) with a continuous stream of new orders and/or other suitable input data by users, which can result in an improvement in reliability and precision for new probabilities generated as output using the machine learning model, as trained. In several embodiments, the machine learning model can determine a probability that a user will likely reorder an item and/or a given quantity of the item on a given day during a subsequent visit to a website that day. In some embodiments, the techniques provided herein can beneficially reduce computing resources and costs.

In a number of embodiments, the techniques described herein can advantageously provide a consistent user experience by dynamically updating the ranked list of items generated by a machine learning model, as trained, and adding recommended items to the ranked list using a collaborative filtering approach. Additionally, a collaborative filtering approach can address a cold start problem for items that do not have a substantial amount of data, such as an item added to a catalog, that a user has not ordered prior to receiving a recommendation. For example, a catalog can include approximately one hundred million items and/or products at any given period of time.

In many embodiments, the techniques described herein can be used continuously at a scale that cannot be handled using manual techniques. For example, the number of daily and/or monthly visits to a website can exceed approximately ten million and/or other suitable numbers, the number of eligible users can exceed approximately one million and/or other suitable numbers, and/or the number of products and/or items sold on the website can exceed approximately ten million (10,000,000) each day.

In a number of embodiments, the techniques described herein can solve a technical problem that arises only within the realm of computer networks, as determining recommendations for an online order does not exist outside the realm of computer networks. Moreover, the techniques described herein can solve a technical problem that cannot be solved outside the context of computer networks. Specifically, the techniques described herein cannot be used outside the context of computer networks, as the techniques described herein us machine learning, which is performed solely on computers.

Various embodiments include a system. The system can include one or more processors and one or more non-transitory computer-readable media storing computing instructions configured to run on the one or more processors and perform certain acts. The acts can include tracking respective duration data for each respective item of items in a catalog based on purchase histories of the each respective item by users. The respective duration data can include measuring a reorder rate for the each respective item within one or more first periods of time. The acts additionally can include generating a Weibull distribution for the each respective item using the respective duration data for the each respective item. The acts further can include training a machine learning model based on previous orders by the users. The machine learning model can include for each respective order of the previous orders by a respective user of the users input data. Input data for the machine learning model can include the Weibull distribution for the each respective item of the items. Input data for the machine learning model also can include brand affinities for the respective user and product type affinities for the respective user. Output data for the machine learning model can include respective indications of whether the respective user ordered the each respective item, respective quantities associated with the each respective item, and a basket size of the each respective order. The acts additionally can include generating, using the machine learning model, as trained, a ranked list of one or more first items for a user of the users, a respective predicted quantity for each of the one or more first items, and an average basket size for the user. The items can include the one or more first items. The acts further can include receiving a request for recommended items from the user using a user interface provided by the retailer. Responsive to the request, the acts also can include sending the ranked list of the one or more first items to be displayed on the user interface.

Many embodiments can include a method. The method can be implemented via execution of computing instructions configured to run at one or more processors and stored at one or more non-transitory computer-readable media. The method can include tracking respective duration data for each respective item of items in a catalog based on purchase histories of the each respective item by users. The respective duration data measuring a reorder rate for the each respective item within one or more first periods of time. The method also can include generating a Weibull distribution for the each respective item using the respective duration data for the each respective item. The method further can include training a machine learning model based on previous orders by the users. The machine learning model can include for each respective order of the previous orders by a respective user of the users input data. Input data for the machine learning model can include the Weibull distribution for the each respective item of the items, brand affinities for the respective user and product type affinities for the respective user. Output data for the machine learning model can include respective indications of whether the respective user ordered the each respective item, respective quantities associated with the each respective item, and a basket size of the each respective order. The method additionally can include generating, using the machine learning model, as trained, a ranked list of one or more first items for a user of the users, a respective predicted quantity for each of the one or more first items, and an average basket size for the user. The items can include the one or more first items. The method further can include receiving a request for recommended items from the user using a user interface provided by the retailer. Responsive to the request, the method also can include sending the ranked list of the one or more first items to be displayed on the user interface.

Although generating a list of regularly ordered items to add to a cart for a user using a smart basket system has been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 can be modified, and that the foregoing discussion of certain of these embodiments does not necessarily represent a complete description of all possible embodiments. For example, one or more of the procedures, processes, or activities of FIGS. 4-5 and 7-8 can include different procedures, processes, and/or activities and be performed by many different modules, in many different orders, and/or one or more of the procedures, processes, or activities of FIGS. 4-5 and 7-8 can include one or more of the procedures, processes, or activities of another different one of FIGS. 4-5 and 7-8. As another example, the systems within smart basket system 305 (FIGS. 3, 6) and/or webserver 320 (FIGS. 3, 6) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform:
      tracking respective duration data for each respective item of items in a catalog based on purchase histories of the each respective item by users, the respective duration data measuring a reorder rate for the each respective item within one or more first periods of time, wherein the one or more first periods of time are each classified into a respective seasonality feature;
      generating a Weibull distribution based on the respective seasonality feature for the each respective item using the respective duration data for the each respective item;
      training a gradient boosting model based on previous orders by the users, such that, for each respective order of the previous orders by a respective user of the users, (a) input patterns for the gradient boosting model comprise the Weibull distribution for the each respective item of the items, brand affinities for the respective user, and product type affinities for the respective user, and (b) output patterns for the gradient boosting model comprise respective indications of whether the respective user ordered the each respective item, respective quantities associated with the each respective item, and a basket size of the each respective order;

generating, using the gradient boosting model, as trained, a ranked list of first items of the items in the catalog for a user of the users, a respective predicted quantity for each of the first items, and an average basket size for the user;

receiving a request for recommended items of the items in the catalog from the user using a user interface provided by a retailer; and responsive to the request, sending the ranked list of the first items of the items in the catalog to be displayed on the user interface.

2. The system of claim 1, wherein the computing instructions are further configured to perform:

adding one or more additional items to the ranked list by using a collaborative filtering process, the collaborative filtering process comprising:
determining a first product type that is most common among product types associated with the first items;
generating an adjacency probability matrix for all items in the first product type, such that a cell at a row and a column of the adjacency probability matrix represents a probability of an item represented by the row being ordered together with an item represented by the column;
determining a set of top co-occurring items in the first product type based on the adjacency probability matrix; and
modifying the ranked list by adding the one or more of the set of top co-occurring items as the one or more additional items.

3. The system of claim 1, wherein the computing instructions are further configured to perform:
grouping the users into crowds based on based on demographic features of the users; and
determining a respective second Weibull distribution for each respective crowd of the crowds.

4. The system of claim 1, wherein:
the reorder rate for the each respective item of the items is based on an average frequency at which the users order the each respective item using a website of the retailer.

5. The system of claim 1, wherein:
receiving the request for the recommended items from the user further comprises:
receiving the request for the recommended items from the user based on the user selecting a typeahead query within the user interface of the user; and
the first items in the ranked list are based on a respective day in which the request is received.

6. The system of claim 1, wherein the computing instructions are further configured to perform:
receiving a selection, from the user interface, of one or more selected items of the first items in the ranked list; and
automatically adding the one or more selected items to a cart of the user.

7. The system of claim 1, wherein the computing instructions are further configured to perform:
determining the brand affinities for the respective user based at least the purchase histories within the one or more first periods of time; and determining the product type affinities for the respective user based at least on (i) the purchase histories, and (ii) product type data of the each respective item within the one or more first periods of time, the product type data being determined by categorizing the each respective item as a product type.

8. The system of claim 1, wherein the computing instructions are further configured to perform, after generating the ranked list of the first items for the user:
reranking the ranked list of the first items using a time decay based on at least an average frequency of the respective user initiating an order using a website of the retailer.

9. The system of claim 1, wherein training the gradient boosting model further comprises using a number of parameters to (i) train the gradient boosting model and (ii) tune the gradient boosting model to fit training data, wherein the number of parameters comprise multiple decision trees.

10. The system of claim 1, wherein generating the Weibull distribution based on the respective seasonality feature for the each respective item comprises tracking a reorder rate for the each respective item based on historical demand over a period of time across seasons.

11. A method being implemented via execution of computing instructions configured to run at one or more processors and stored at one or more non-transitory computer-readable media, the method comprising:
tracking respective duration data for each respective item of items in a catalog based on purchase histories of the each respective item by users, the respective duration data measuring a reorder rate for the each respective item within one or more first periods of time, wherein the one or more first periods of time are each classified into a respective a seasonality feature;

generating a Weibull distribution based on the respective seasonality feature for the each respective item using the respective duration data for the each respective item;

training a gradient boosting model based on previous orders by the users, such that, for each respective order of the previous orders by a respective user of the users, (a) input patterns for the gradient boosting model comprise the Weibull distribution for the each respective item of the items, brand affinities for the respective user, and product type affinities for the respective user, and (b) output patterns for the gradient boosting model comprise respective indications of whether the respective user ordered the each respective item, respective quantities associated with the each respective item, and a basket size of the each respective order;

generating, using the gradient boosting model, as trained, a ranked list of first items of the items in the catalog for a user of the users, a respective predicted quantity for each of the first items, and an average basket size for the user;

receiving a request for recommended items of the items in the catalog from the user using a user interface provided by a retailer; and responsive to the request, sending the ranked list of the first items of the items in the catalog to be displayed on the user interface.

12. The method of claim 11, further comprising:
adding one or more additional items to the ranked list by using a collaborative filtering process, the collaborative filtering process comprising:
determining a first product type that is most common among product types associated with the first items;

generating an adjacency probability matrix for all items in the first product type, such that a cell at a row and a column of the adjacency probability matrix represents a probability of an item represented by the row being ordered together with an item represented by the column;

determining a set of top co-occurring items in the first product type based on the adjacency probability matrix; and modifying the ranked list by adding the one or more of the set of top co-occurring items as the one or more additional items.

13. The method of claim 11, further comprising:

grouping the users into crowds based on based on demographic features of the users; and determining a respective second Weibull distribution for each respective crowd of the crowds.

14. The method of claim 11, wherein:

the reorder rate for the each respective item of the items is based on an average frequency at which the users order the each respective item using a website of the retailer.

15. The method of claim 11, wherein:

receiving the request for the recommended items from the user further comprises:

receiving the request for the recommended items from the user based on the user selecting a typeahead query within the user interface of the user; and the first items in the ranked list are based on a respective day in which the request is received.

16. The method of claim 11, further comprising:

receiving a selection, from the user interface, of one or more selected items of the first items in the ranked list; and automatically adding the one or more selected items to a cart of the user.

17. The method of claim 11, further comprising:

determining the brand affinities for the respective user based on at least the purchase histories within the one or more first periods of time; and determining the product type affinities for the respective user based at least on (i) the purchase histories, and (ii) product type data of the each respective item within the one or more first periods of time, the product type data being determined by categorizing the each respective item as a product type.

18. The method of claim 11, further comprising, after generating the ranked list of the first items for the user:

reranking the ranked list of the first items using a time decay based on at least an average frequency of the respective user initiating an order using a website of the retailer.

19. The method of claim 11, wherein training the gradient boosting model further comprises using a number of parameters to (i) train the gradient boosting model and (ii) tune the gradient boosting model to fit training data, wherein the number of parameters comprise multiple decision trees.

20. The method of claim 11, wherein generating the Weibull distribution based on the respective seasonality feature for the each respective item comprises tracking a reorder rate for the each respective item based on historical demand over a period of time across seasons.

* * * * *